UNITED STATES PATENT OFFICE.

PAUL DE BRÜNN, OF DUSSELDORF, GERMANY.

MANUFACTURE OF ZEOLITES.

1,161,200. Specification of Letters Patent. Patented Nov. 23, 1915.

No Drawing. Application filed July 14, 1913. Serial No. 778,977.

*To all whom it may concern:*

Be it known that I, PAUL DE BRÜNN, a citizen of the German Empire, residing at 54 Graf Reckestrasse, Dusseldorf, Germany, have invented certain new and useful Improvements in and Relating to the Manufacture of Zeolites, of which the following is a specification.

This invention relates to the manufacture of a substance having a base-exchanging faculty and adapted for the softening and purification of water and other industrial uses.

The invention has for its object to produce such a substance by the wet method and with a high and active capacity for the exchange of base and in a condition that is hard and suitable for its effective use as a filtering medium.

I have found that a substance having these qualities can be produced by carrying out the reaction with the reagents in extremely dilute solution, and by the employment of soluble sodium salts such as sodium phosphate or sulfate chlorid in relatively considerable quantity.

The invention comprises the process which is hereinafter described and the product of the process.

In carrying the invention into effect I make a solution in water of sodium sulfate, that is to say, for example, 6 lbs. of sodium sulfate in 12 gallons of water. I then add, for example, 844 c.c. of a solution of sodium aluminate containing 45.6 grams of alumina, and stir up the mixture. I then add, for example, 315 grams of sodium silicate 45° Baumé containing 75 grams of $SiO_2$. I then stir up the mixture and bring it to the boil. A flocculent precipitate is thus formed, which I allow to settle, and pump off the clear liquor. A substance remains in the form of a jelly or jelly-paste. The precipitate is then washed in a large volume of water, by which all adhering soluble substances are removed and the clear liquor drained off the waste. The precipitate is then pumped through a filter press, and a cake is produced ready for drying. The cake produced may then be dried in a current of air as the result of which it splits up into pieces, and after drying the substance is leached in hot or boiling water. The process of leaching may be assisted by the pieces being broken up between rollers or by other suitable means, and a product remains in the form of small hard grains, in which condition it is available for the softening or purification of water or for any other purpose without any further treatment.

The precipitate may be taken direct from the precipitating tank into a filter press and washed there.

It will be understood that the product thus produced is in the form of hard grains and has a high and active capacity for the exchange of the soda base and that this base may be exchanged for another on merely passing through the substance a solution of a corresponding salt. It will furthermore be understood that the clear liquor from which the precipitate has been removed and which consists of a solution of sodium sulfate and sodium hydrate, may be again used, that is to say, the liquor may be neutralized with an acid such as sulfuric acid, so that it may thus consist wholly of a solution of sodium sulfate. This may be corrected in degree of concentration, that is, it may, for example, be made into a 5 per cent. solution, so that the process hereinbefore described may then be repeated. Or again, the liquor may have added to it such a quantity of soda as is necessary to produce with the aluminium salt employed as concentrated a solution of sodium aluminate as is necessary in the process as hereinbefore described.

What I claim as my invention and desire to secure by Letters Patent is:—

1. A process for the manufacture of base-exchanging substances in the wet way, consisting in mixing solutions of alkali metal silicate and alkali metal aluminate, producing a precipitate by the resulting reaction in the form of a jelly or jelly-paste, washing the said precipitate, forming the said precipitate into a cake, and drying the cake.

2. A process for the manufacture of base-exchanging substances in the wet way, consisting in mixing solutions of alkali metal silicate and alkali metal aluminate, producing a precipitate by the resulting reaction in the form of a jelly or jelly-paste, washing the said precipitate, and passing the said precipitate through a filter press to produce a cake and drying the cake.

3. A process for the manufacture of base-exchanging substances in the wet way, consisting in mixing solutions of alkali metal silicate and alkali metal aluminate, producing a precipitate in the form of a jelly or jelly-paste by using the said reagents in extreme dilution, washing the said precipitate, forming the said precipitate into a cake, and drying the cake.

4. A process for the manufacture of base-exchanging substances in the wet way, consisting in mixing solutions of alkali metal silicate and alkali metal aluminate, producing a precipitate in the form of a jelly or jelly-paste by using the said reagents in extreme dilution and in the presence of a larger proportion of a soluble sodium salt than of both the said reagents, washing the said precipitate, forming the said precipitate into a cake, and drying the cake.

5. A process for the manufacture of base-exchanging substances in the wet way, consisting in mixing solutions of alkali metal silicate and alkali metal aluminate, producing a precipitate in the form of a jelly or jelly-paste by using the said reagents in extreme dilution, washing the said precipitate, and passing the precipitate through a filter press to produce a cake and drying the cake.

6. A process for the manufacture of base-exchanging substances in the wet way, consisting in mixing solutions of alkali metal silicate and alkali metal aluminate, producing a precipitate in the form of a jelly or jelly-paste by using the said reagents in extreme dilution in the presence of a larger proportion of a soluble sodium salt than of both the said reagents, washing the said precipitate, passing the said precipitate through a filter press to produce a cake, and drying the cake.

7. A process for the manufacture of base-exchanging substances in the wet way, consisting in mixing solutions of alkali metal silicate and alkali metal aluminate, producing a precipitate in the form of a jelly or jelly-paste by using the said reagents in extreme dilution and in the presence of a larger proportion of sodium sulfate than of both the said reagents, washing the said precipitate, forming the said precipitate into a cake, and drying the cake.

8. A process for the manufacture of base-exchanging substances in the wet way, consisting in mixing together a solution containing alumina and silica and a larger proportion of a sodium salt than of both the said reagents, producing a precipitate in the form of a jelly or jelly-paste by the resulting reaction, and washing and drying the said precipitate.

9. A process for the manufacture of base-exchanging substances in the wet way, consisting in mixing together a solution containing alumina and silica and a larger proportion of sodium sulfate than of both the said reagents, producing a precipitate in the form of a jelly or jelly-paste by the resulting reaction, and washing and drying the said precipitate.

10. A product of manufacture, being a precipitated base-exchanging substance in the condition of hard grains.

In testimony whereof I have hereunto signed my name to this specification in the presence of two subscribing witnesses.

PAUL DE BRÜNN.

Witnesses:
 WILLIAM EDWARD EVANS,
 ROBERT OWEN HUGHES.